US006796245B2

(12) United States Patent
Parker et al.

(10) Patent No.: US 6,796,245 B2
(45) Date of Patent: Sep. 28, 2004

(54) UNITARY HEADER/BASE/SHORTING BAR HOLDER FOR A MICRO GAS GENERATOR, AND MICRO GAS GENERATOR USING IT

(75) Inventors: Todd S. Parker, Hollister, CA (US); Michael D. Campbell, Hollister, CA (US)

(73) Assignee: LifeSparc, Inc., Hollister, CA (US)

( * ) Notice: Subject to any disclaimer, the term of this patent is extended or adjusted under 35 U.S.C. 154(b) by 0 days.

(21) Appl. No.: 10/115,875

(22) Filed: Apr. 3, 2002

(65) Prior Publication Data

US 2002/0162476 A1 Nov. 7, 2002

Related U.S. Application Data (60) Provisional application No. 60/281,327, filed on Apr. 3, 2001.

(51) Int. Cl.[7] .............. C06D 5/00; F42B 3/18
(52) U.S. Cl. ............ 102/530; 102/202.1; 102/202.7; 102/202.9; 102/202.14; 280/741
(58) Field of Search .......... 102/202.1–202.14, 102/530, 531; 280/741

(56) References Cited

U.S. PATENT DOCUMENTS

| | | | | |
|---|---|---|---|---|
| 4,335,653 A | * | 6/1982 | Bratt et al. | 102/202.8 |
| 5,243,492 A | * | 9/1993 | Marquit et al. | 102/202.9 |
| 5,401,180 A | * | 3/1995 | Muzslay | 102/202.2 |
| 5,423,261 A | | 6/1995 | Bernardy et al. | 102/202.14 |
| 5,648,634 A | * | 7/1997 | Avory et al. | 102/202.1 |
| 5,763,814 A | * | 6/1998 | Avory et al. | 102/202.7 |
| 5,893,583 A | | 4/1999 | Blumenthal et al. | 280/737 |
| 6,146,598 A | * | 11/2000 | Duvacquier et al. | 280/741 |
| 6,155,171 A | * | 12/2000 | Haegeman et al. | 102/202.9 |

FOREIGN PATENT DOCUMENTS

| | | | | |
|---|---|---|---|---|
| DE | 198 20 757 | | 11/1999 | B60R/21/26 |
| DE | 2 00 201 01 | * | 4/2001 | 102/202.01 |
| EP | 1 030 159 | | 8/2000 | F42B/3/12 |
| JP | 2000329500 | | 11/2000 | F42B/3/12 |

* cited by examiner

Primary Examiner—Michael J. Carone
Assistant Examiner—James S. Bergin
(74) Attorney, Agent, or Firm—Heller Ehrman White & McAuliffe LLP (57) ABSTRACT

A unitary header/base/shorting bar holder for a micro gas generator; and a micro gas generator containing it.

26 Claims, 9 Drawing Sheets

*Prior Art*

*FIG. 9*

UNITARY HEADER/BASE/SHORTING BAR HOLDER FOR A MICRO GAS GENERATOR, AND MICRO GAS GENERATOR USING IT

CROSS-REFERENCE TO RELATED APPLICATION

This application claims the priority under 35 USC 119(e) of U.S. Provisional Application No. 60/281,327, filed Apr. 3, 2001, which is incorporated into this application by reference.

BACKGROUND OF THE INVENTION

1. Field of the Invention

This application relates to micro gas generators.

2. Description of the Prior Art

Micro gas generators are small pyrotechnic devices used to generate gas pressure to produce work. They are manufactured by a number of suppliers including LivBag (a subsidiary of AutoLiv), Special Devices, Inc., Davey Bickford, Nippon Kayaku, Takata Kogyo, OEA, and others.

In modern automobiles, seat belts are often fitted with pretensioners, designed to retract and tighten a seat belt around a passenger in the automobile, not merely to prevent its further extension. The pretensioner frequently uses a micro gas generator that is fired by a sensor mechanism indicating, for example, rapid deceleration of the automobile. The micro gas generator is contained in one end of a cylinder which also contains a piston. When the generator fires, the piston is driven down the cylinder and applies pressure to the seatbelt, retracting it and tightening is around the passenger. An animated cartoon showing a rotary seat belt pretensioner may be seen at http://www.autoliv.com/appl_alv/autoliv.nsf/pages/seat_belts_pretensioners. Micro gas generators are similarly used to inflate airbags for automobiles and for a number of other safety-related purposes.

It will readily be understood that a micro gas generator employed in an automobile, even though it may never fire during the life of the automobile, and is capable of firing only once, must be extremely reliable; and it is critical that the generator not be subject to such damage from environmental conditions and aging that it will not fire when properly initiated, and equally that it not be easily subject to improper initiation when not emplaced in its socket. For this reason, a hermetic seal is required around the charges and the ignition element; and a shorting device is required to prevent inadvertent initiation.

Figure 1:
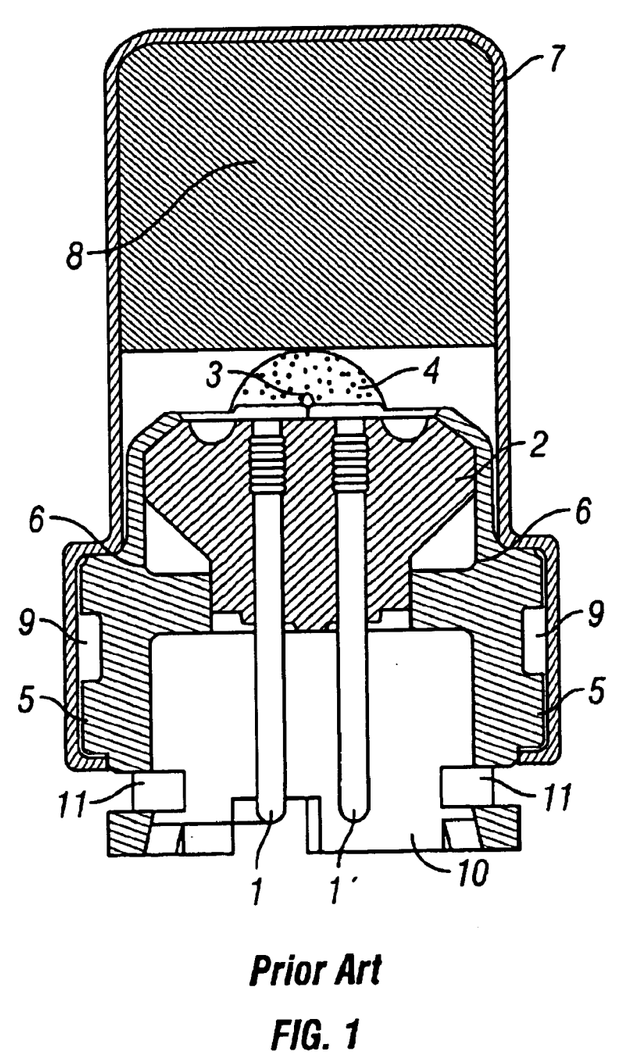
FIG. 1 is a cross-section of an example of a prior art micro gas generator.

A typical micro gas generator, which is generally cylindrical, having a largest diameter of about 17 mm and a length of about 28 mm, is illustrated in cross-section in FIG. 1. In that Figure, two metallic contact pins 1,1' pass through a polymeric header 2. The pins, which are sealed through the header 2, such as by buttress knurling of the pins and/or the use of an adhesive about the heads of the pins, carry current from an external source [for example, the control circuit that responds to rapid deceleration, when the micro gas generator is used in an automobile seat belt pretensioner] to a metallic bridge wire or similar ignition element 3 (such as a semiconductor bridge—see, for example, U.S. Pat. No. 5,912, 427), which when electrically energized with an appropriate signal, produces a high temperature arc or spark to initiate the explosion of a primary charge 4 surrounding the bridge wire 3. Frequently, but not in the example of this Figure, the primary charge 4 is contained within a cup-shaped holder or inner can that attaches to the top of the header. The header 2 is fastened into the metallic base 5, typically by crimping, and sealed therewithin, typically by an O-ring 6. The assembly of the header and base and associated pins and bridge wire is crimped within a metallic output can 7 (sometimes referred to as a director can), which contains a secondary charge 8 to produce the necessary gas pressure output on ignition by the primary charge 4, and sealed by an O-ring 9. Typically, a shorting clip assembly 10, consisting of a polymeric holder and a shaped piece of spring metal held within the holder, not illustrated in detail in this Figure, is placed within the lower part of the base 5 below the header 2 so that the spring metal contacts both metallic pins 1, 1' and shorts them when the generator is not mounted, preventing accidental ignition of the generator. The lower part of the base is typically fitted with sockets 11 to engage a clip from the wiring harness of the automobile, carrying trigger wires from the sensor circuit. The generator is placed into the seat belt pretensioner and the clip attached to the base; and attachment of the clip to the base separates the spring metal of the shorting clip assembly from the pins of the generator, allowing the generator to fire when the appropriate electrical signal is given by the sensor circuit.

The prior art design, although widely adopted, has a number of drawbacks:

(1) there are a large number of independent components, which must be manufactured and assembled.

These result in high production costs and the need for precise tolerances to avoid mismatching during assembly;

(2) there are four sealing paths: the two pins through the header, the header to the base (O-ring), and the base to the output can (O-ring). Each of the components around these seals must be precisely made and aligned to ensure a hermetic seal; and (3) a separate shorting clip assembly must be manufactured and inserted into the micro gas generator to prevent accidental discharge. This requires the manufacture and assembly of additional components, adding cost and complexity.

During the manufacturing process, a test gas (such as krypton) is used to determine whether the micro gas generator has a hermetic seal. The generator is placed in a pressure chamber and the test gas allowed to fill the chamber under pressure and equilibrate. The test gas is then evacuated from the chamber and the generator is tested with a suitable detector, e.g. a gamma counter, to determine whether the test gas has entered and is leaking from the generator.

Examples of micro gas generators/igniters are given, for example, in U.S. Pat. Nos. 5,647,924; 5,648,634; 5,711,531; and 5,728,964.

There is thus an unmet need for a simpler and less expensive design for a micro gas generator, requiring fewer independent components.

The disclosures of the documents listed in this section and elsewhere throughout this application are incorporated herein by reference.

SUMMARY OF THE INVENTION

In a first aspect, this invention is a unitary header/base/shorting bar holder for a micro gas generator.

In a second aspect, this invention is a unitary header/base/shorting bar holder for a micro gas generator, further comprising a primary charge holder that is unitary with the header/base/shorting bar holder.

In a third aspect, this invention is a unitary header/base/shorting bar holder of the first or second aspects of the invention for a micro gas generator, further comprising a pair of contact pins sealed hermetically through the header.

In a fourth aspect, this invention is a unitary header/base/shorting bar holder of the third aspect of this invention, further comprising a shorting bar mounted within the shorting bar holder to short out the contact pins when the unitary header/base/shorting bar holder is not interlocked with a connector.

In a fifth aspect, this invention is a unitary header/base/shorting bar holder of any one of the first through fourth aspects of the invention for a micro gas generator, further comprising at least one vent to permit free escape of gas from the non-sealed volume of the generator into which the unitary header/base/shorting bar holder is assembled.

In a sixth aspect, this invention is a unitary header/base/shorting bar holder of any one of the first through fifth aspects of the invention for a micro gas generator, further comprising an interlocking feature in the base to interlock the unitary header/base/shorting bar holder with a connector.

In a seventh aspect, this invention is a unitary header/base/shorting bar holder of the sixth aspect of the invention for a micro gas generator, further comprising a keying feature to orient the unitary header/base/shorting bar holder with the connector.

In an eighth aspect, this invention is a micro gas generator incorporating the unitary header/base/shorting bar holder of any one of the first through seventh aspects of this invention. Such a micro gas generator consists essentially of:

(a) the unitary header/base/shorting bar holder of claim 1;
(b) a pair of parallel contact pins extending through the unitary header/base/shorting bar holder and sealed therewithin, so that each pin has a head protruding above the top of a header portion of the unitary header/base/shorting bar holder and a body protruding through a base portion thereof;
(c) a shorting bar, mounted on the base and shorting the bodies of the contact pins;
(d) an ignition element connecting the heads of the contact pins;
(e) a primary charge adjacent to the ignition element and adapted to be ignited thereby;
(f) optionally, a secondary charge to be ignited by the primary charge;
(g) a single O-ring, seated on an external shoulder of the base of the unitary header/base/shorting bar holder, the shoulder facing upwardly toward the header; and
(h) an output can, mounted over the unitary header/base/shorting bar holder from the direction of the header, sealingly engaged with the base thereof by compression of the O-ring, and crimped about a bottom edge of the base thereof.

In an ninth aspect, this invention is a method of assembling the micro gas generator of the eighth aspect of this invention.

DETAILED DESCRIPTION OF THE INVENTION

Definition: "unitary" means made in a single piece, such as by molding or the like. The unitary header/base/shorting bar holder of this invention will be made of a material such as a polymer, in particular a fiber reinforced engineering polymer (reinforced with glass or other fibrous reinforcing material of the type known in the art for polymer reinforcement).

Suitable such polymers are have considerable mechanical strength especially at high temperatures, because it is critical that the base of the micro gas generator (i.e. the unitary header/base/shorting bar holder when surrounded by the outer can) in contact with the connector with which it is interlocked should not allow the escape of gas from the generator through the base, or around the pins or O-ring seal, when the generator is ignited. They include engineering polyesters such as polybutylene terephthalate, polybutylene naphthalate, and the like; high strength polyamides such as nylon 6,12, nylon 10,12, nylon 12,12, and the like; thermoplastic aromatic polyamides such as Amodel™ polyphthalamide (BP Chemicals); polyether-amides; polyimides such as Aurum™ (MTC America); polyether-imides; and the like; and polyether-ketones (PEK), polyether-ether-ketones (PEEK), polyether-ketone-ether-ketone-ketones (PEKEKK), and similar high temperature thermoplastic aromatic polyketone polymers, liquid crystal polymers (LCP), Vectra™ A515, and compatible mixtures of any two or more of the above. Suitable compression molding compounds include alkyds.

The polymers must provide a hermetic barrier, so polymers with minimal water absorption are desirable; and must have a good sealing surface; good long term creep resistance and freedom from stress-induced cracking so that they do not crack when the pins are inserted; and good high temperature strength so that they will not deform under use conditions. Preferred polymers are glass-reinforced polyether-imides and glass-reinforced polybutylene terephthalate, e.g. containing 40% glass fibers, for example from the RTP Company, Winona, Minn.

The polymers will typically also contain antioxidants, flame retardants, and/or other stabilizers such as are conventional in polymeric articles, and may contain pigments, plasticizers, and the like, all in conventional amounts.

Figure 2:
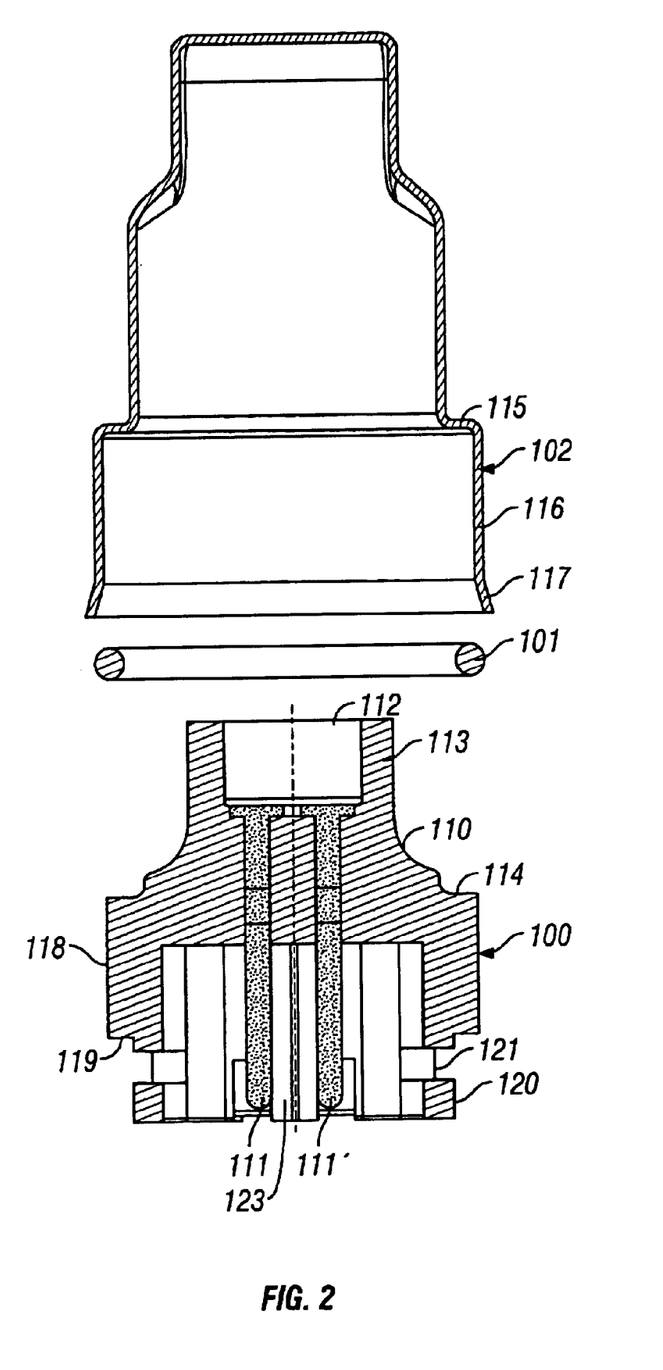
FIG. 2 is an exploded cross-section of an example of the unitary header/base/shorting bar holder of the second aspect of this invention, shown together with the outer can and O-ring seal that will form a hermetically sealed micro gas generator.

FIG. 2 is an exploded cross-section of the unitary header/base/shorting bar holder of the second aspect of this invention, shown together with the outer can and O-ring seal that will form a hermetically sealed micro gas generator. The base of the micro gas generator shown generally at 100 includes the unitary header/base/shorting bar holder 110, and two metallic contact pins 111 and 111' (comparable to the pins 1 and 1' of FIG. 1) are shown inserted into the header. The pins are shown with buttress knurling, of the type described in U.S. Pat. No. 5,711,531. The header is shown provided with a cup or holder 112 formed by walls 113 extending above the heads of the pins, to provide a holder for the primary charge, though this feature is optional to the invention (it is a part of the second aspect of the invention but not a part of the first aspect of the invention). When the micro gas generator is assembled [and a person of ordinary skill in the art will realize that it will contain a bridge wire or equivalent ignition element, primary charge, and secondary charge all not shown in this Figure], O-ring 101 will lie on shoulder 114 of the unitary header/base/shorting bar holder and the outer can shown generally at 102 will overlie the unitary header so that the O-ring 101 is compressed between shoulder 114 of the header and shoulder 115 of the outer can; while lower wall 116 of the outer can overlies and reinforces the outer cylindrical surface 118 of the unitary header/base/shorting bar holder of this invention, with the flared end 117 being crimped over edge 119 of the base. Optional interlocking features 120 define slots 121, shown in mote detail in other Figures) for interlocking with a connector (not shown) that will bring electrical power to the micro gas generator.

By comparing FIG. 1 with FIG. 2, it can be seen that the polymeric header 2, metallic base 5, and the O-ring 6 between them, and shorting bar holder 10 have all been replaced with a unitary structure with a sealing position such that the O-ring 101 of FIG. 2 is directly in compression as the outer can 102 is crimped to the unitary header/base/shorting bar holder of this invention, reducing by one the number of O-ring seals required and simplifying the O-ring seal that is used, reducing by three the number of other parts required, and greatly simplifying assembly of the micro gas generator.

Figure 3:
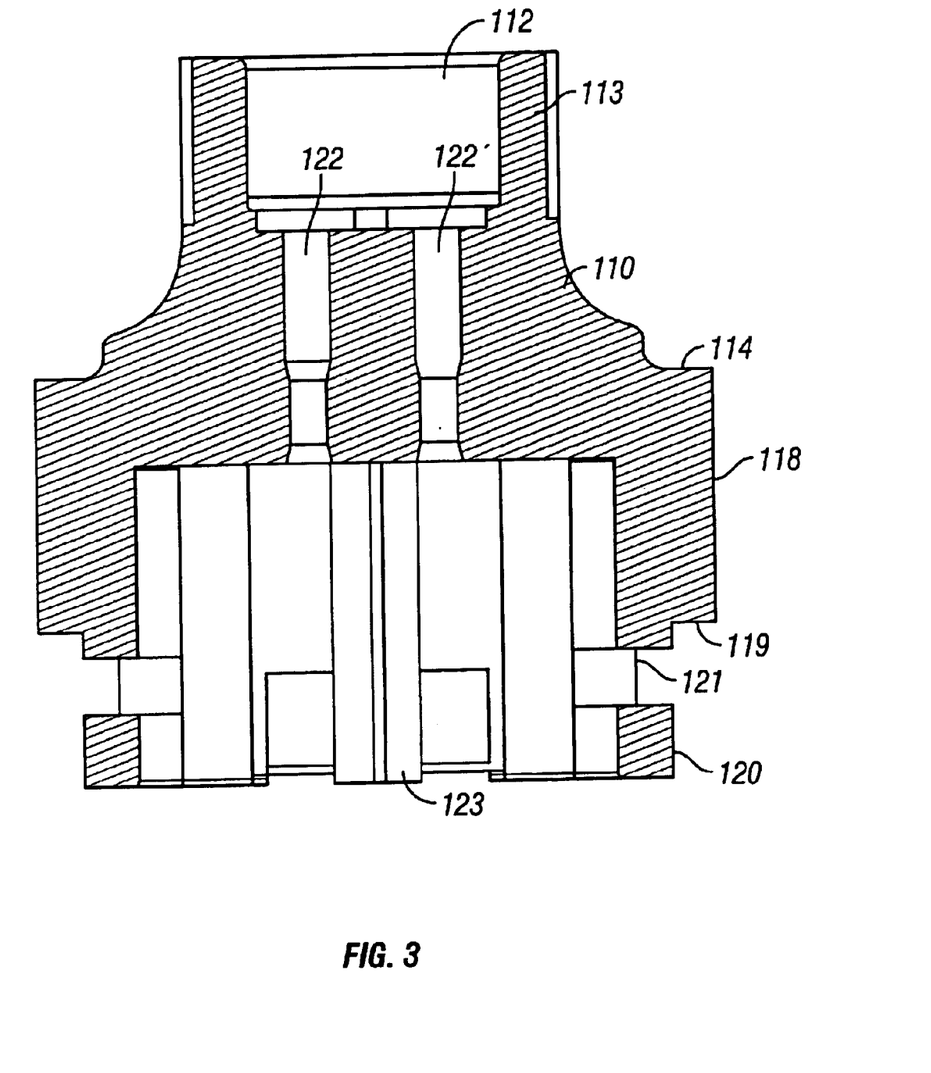
FIG. 3 is a cross-section of the same section as is shown in FIG. 2.

FIG. 3 is a cross-section of the same section as is shown in FIG. 2, but without the pins and outer can and O-ring. Bores 122 and 122' retain the pins when they are inserted into the header. Some more of the structure of the shorting bar holder, such as rib 123, may be seen between where the pins will protrude to meet the connector when the micro gas generator is interlocked with it.

Figure 4:
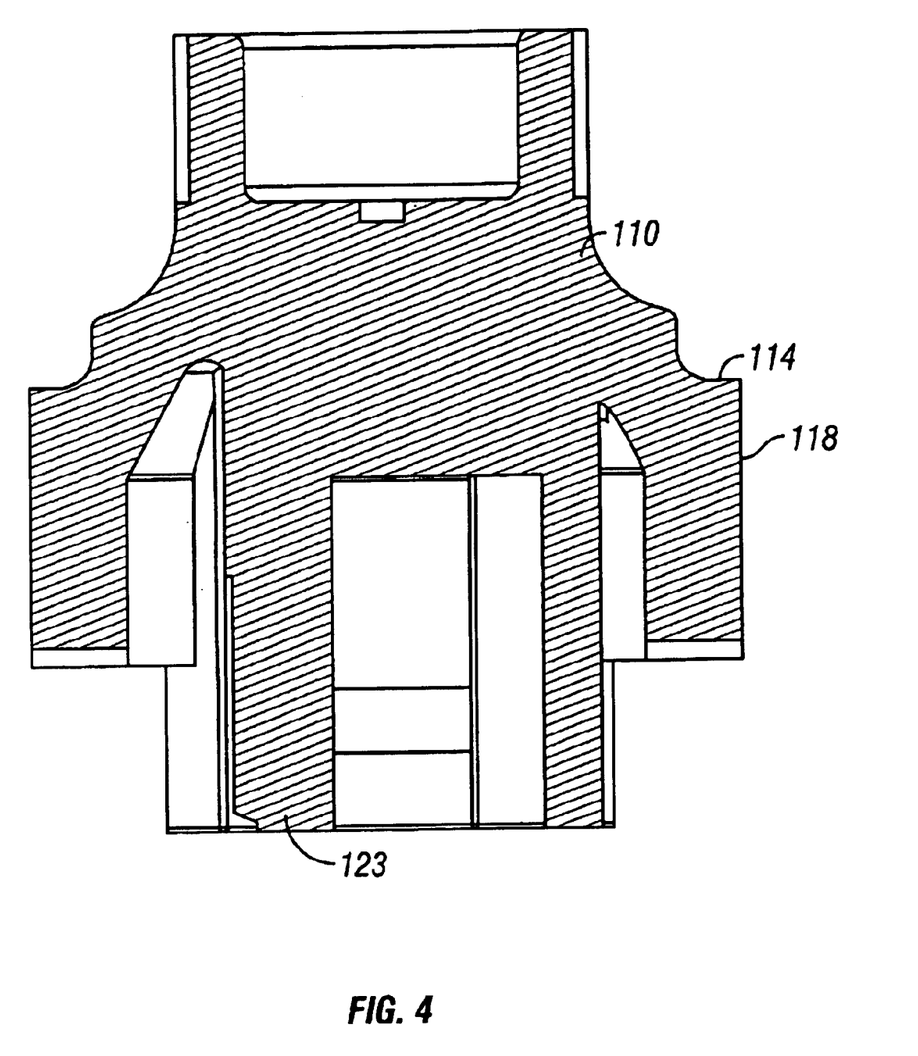
FIG. 4 is a perpendicular cross-section to the cross-section of FIG. 3.

FIG. 4 is a perpendicular cross-section to the cross-section of FIG. 3, showing clearly a rib 123 of the shorting bar holder.

From these cross-sectional views of FIGS. 2 through 4, it can be seen that the unitary header/base/shorting bar holder of this invention provides a massive supporting structure that, when encased in the lower portion 116 of the outer can, causes the force of the explosion of the primary and secondary charges of the micro gas generator to force the unitary header/base/shorting bar holder firmly into the crimp formed around edge 119, minimizing the risk of the unitary header/base/shorting bar holder deforming and allowing the escape of gas from the explosion.

Figure 5:
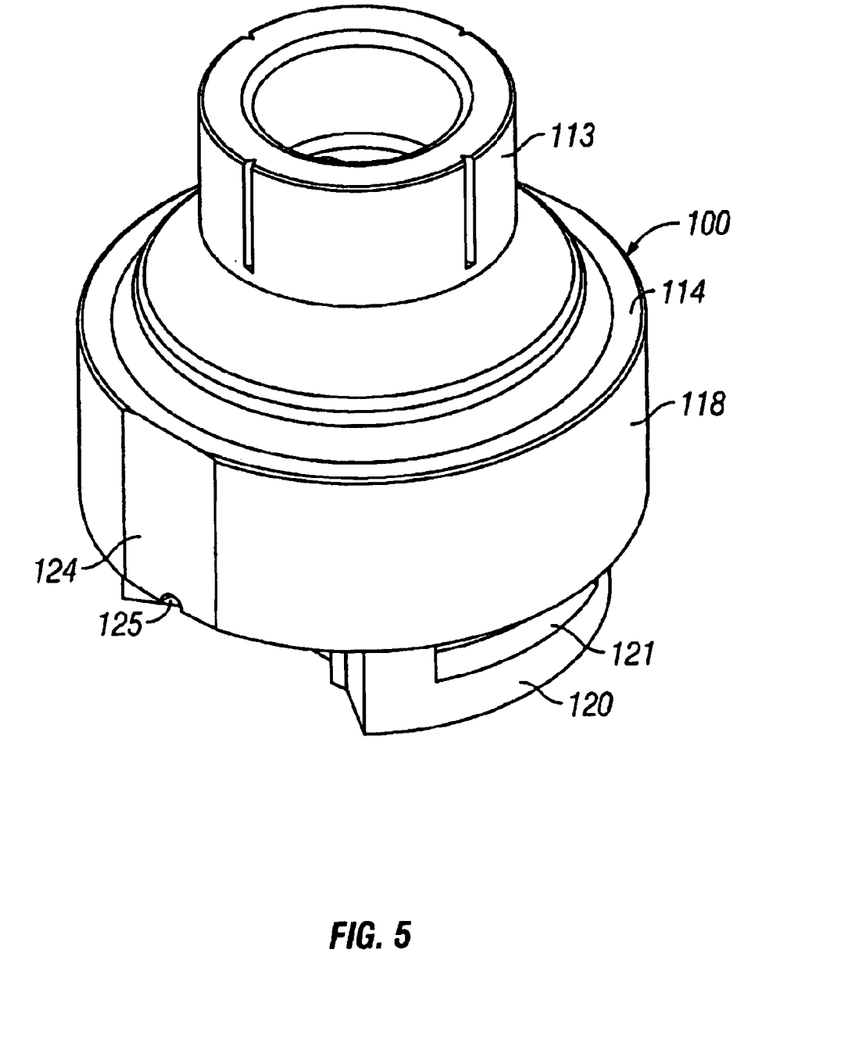
FIG. 5 is an upper perspective view of the unitary header/base/shorting bar holder of FIG. 2.

FIG. 5 is an upper perspective view of the unitary header/base/shorting bar holder of FIG. 2. In this view, the cylindrical nature of the unitary header/base/shorting bar holder can readily be seen, as can the more of the nature of the optional interlocking feature 120 and slot 121. Also visible in this perspective view is a flat 124 in cylindrical wall 118 and a vent groove 125, designed to permit free escape of gas from the non-sealed volume of the generator into which the unitary header/base/shorting bar holder is assembled, so that test gas is not entrapped between the crimp and the sealed area of the micro gas generator when it is tested after assembly.

Figure 6:
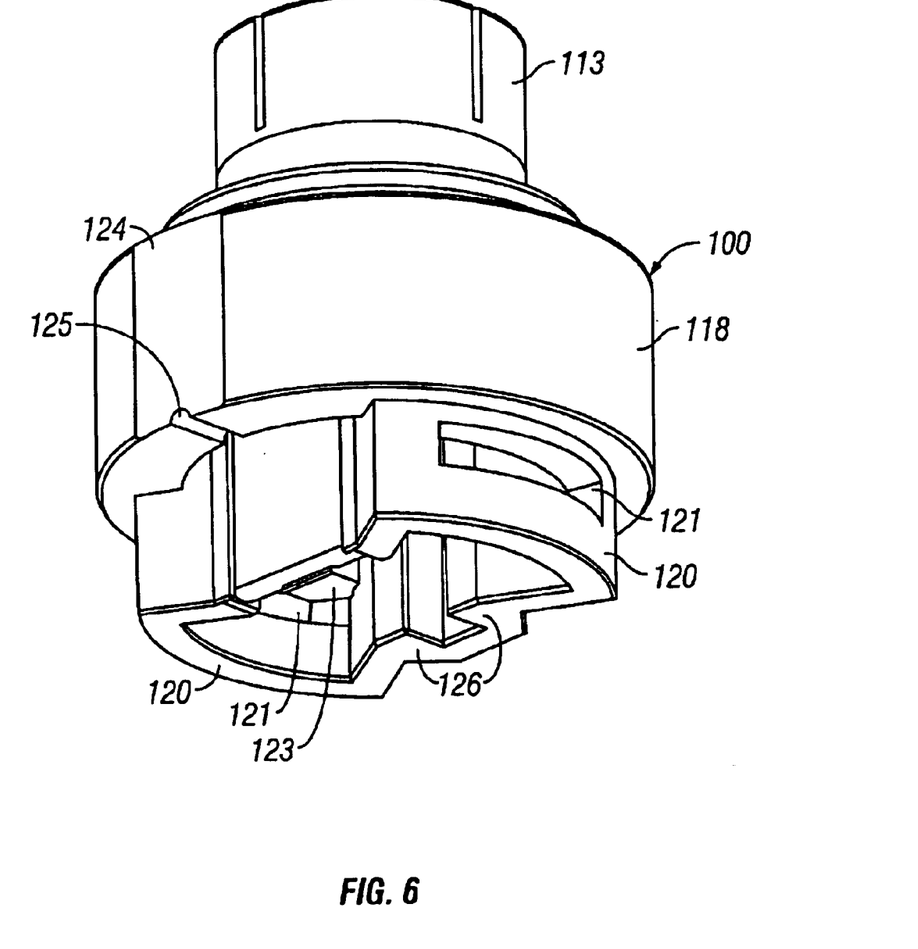
FIG. 6 is a lower perspective view of the unitary header/base/shorting bar holder of FIG. 2.

FIG. 6 is a lower perspective view of the unitary header/base/shorting bar holder of FIG. 2. In this view, the flat 124 and vent groove 125 are clearly seen, as are one of the ribs 123 forming the shorting bar holder, and the optional interlocking feature 120 and slot 121 (paired) which enable interlocking of the assembled micro gas generator with a connector. Optional keying features 126 (to enable proper orientation of the micro gas generator with a connector) of the unitary header/base/shorting bar holder are also seen.

Figure 7:
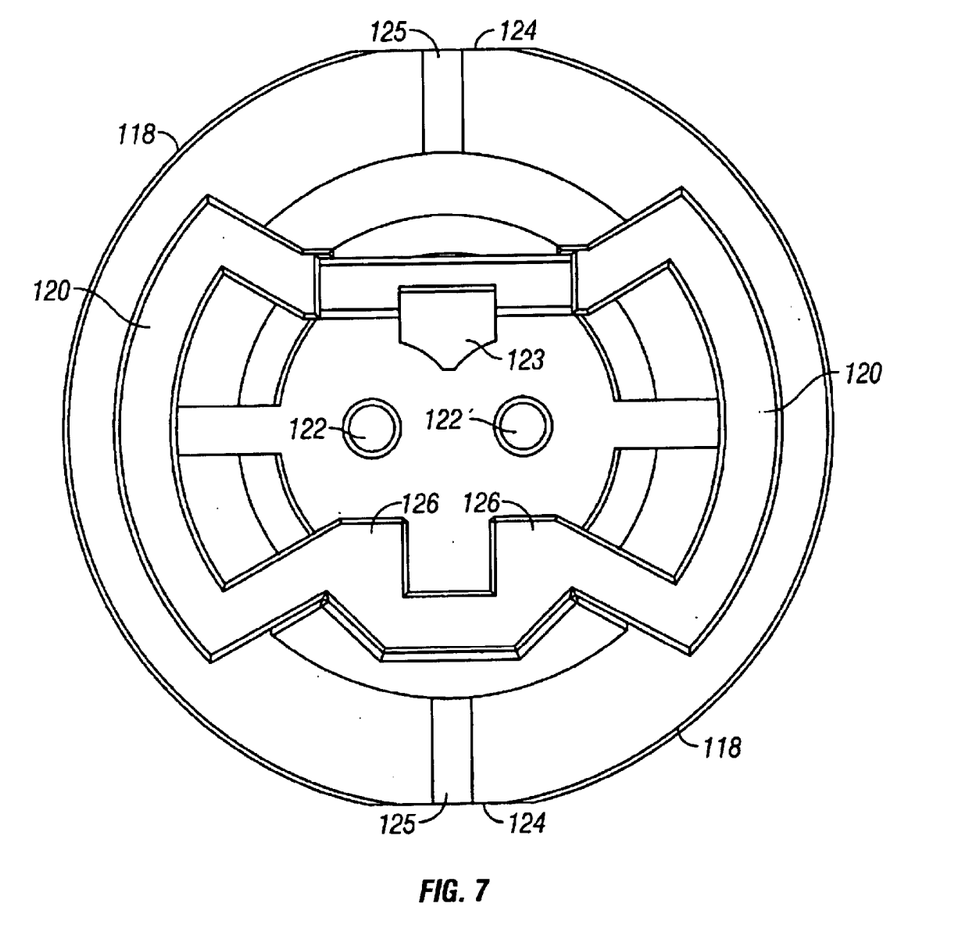
FIG. 7 is a bottom view of the unitary header/base/shorting bar holder of FIG. 2.

FIG. 7 is a bottom view of the unitary header/base/shorting bar holder of FIG. 2. In this view, the shorting bar holder portion of the unitary header/base/shorting bar holder is particularly clearly seen, and the bores 122 and 122' for the contact pins are also visible. The spring metal shorting bar (not shown) fits into the shorting bar holder behind rib 123 such that two parts of the shorting bar protrude past the rib 123 on either side and can contact and short the pins 111, 111', as discussed previously with regard to FIG. 1.

Details of the shape of the optional interlocking feature and of the optional keying features of the shorting bar holder shown in these Figures are not critical (except for their functional aspects), as different manufacturers of airbags, pretensioners and the like, and of the wiring harnesses and connectors that conduct the firing current to the micro gas generators used in them, employ different keying and interlocking features to ensure that only the appropriate micro gas generator can be used in the airbag, pretensioner, or similar device. Adaptation of the unitary header/base/shorting bar holder of this invention to the interlocking features and keying features of a particular connector will be within the skill of a person of skill in the art of micro gas generators having regard to that skill and this disclosure.

Figure 8:
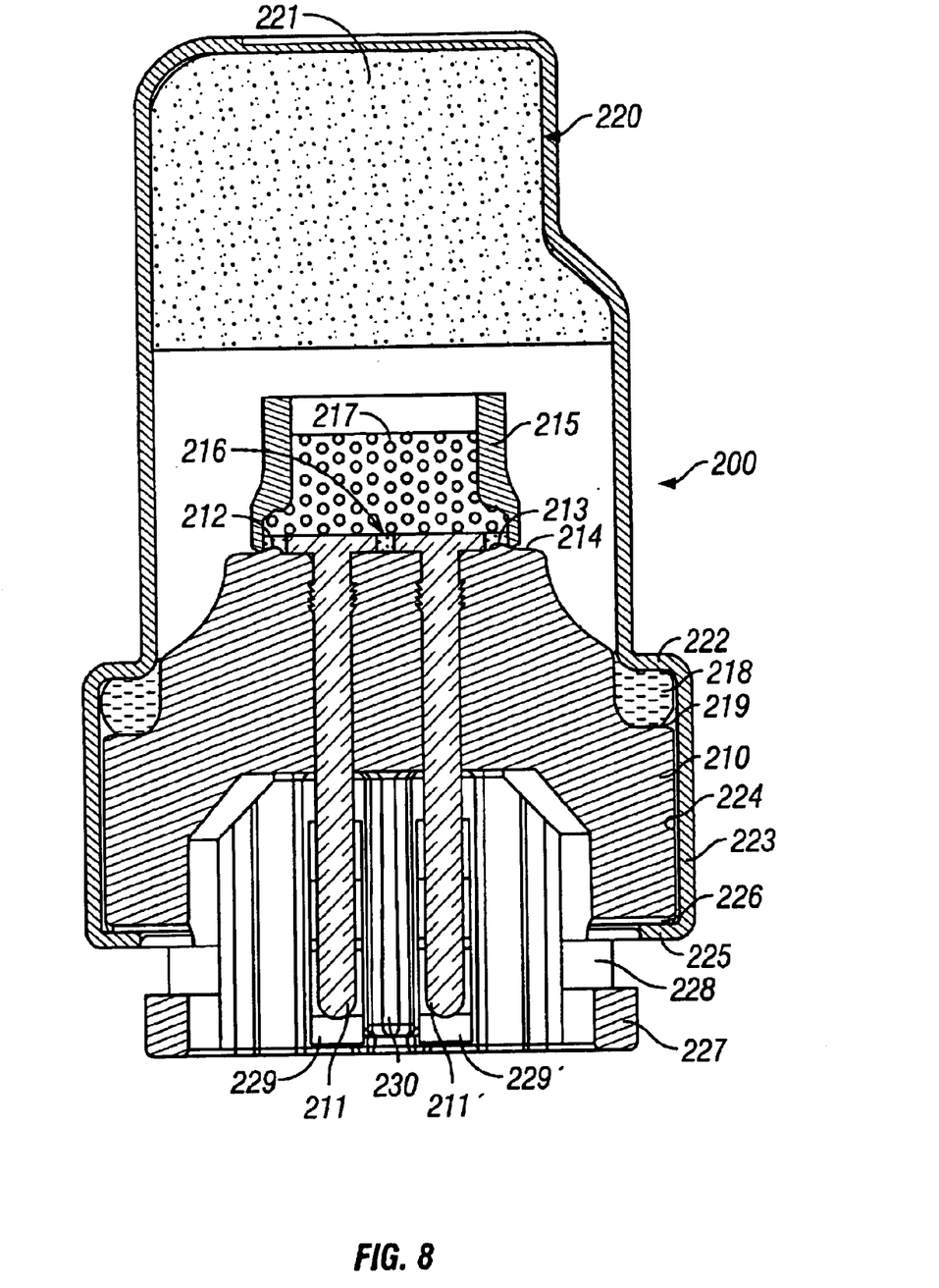
FIG. 8 is a cross-section of a micro gas generator of the eighth aspect of this invention, incorporating the unitary header/base/shorting bar holder of the first aspect of this invention.

FIG. 8 is a cross-section of a micro gas generator of the eighth aspect of this invention, incorporating the unitary header/base/shorting bar holder of the first aspect of this invention, and having a slightly different configuration of base from that of the unitary header/base/shorting bar holder of FIGS. 2 through 7. The base of the micro gas generator shown generally at 200 includes the unitary header/base/shorting bar holder 210, and two metallic contact pins 211 and 211' inserted through the header. The pins are shown with buttress knurling, of the type described in U.S. Pat. No. 5,711,531, and the top surface 214 may be provided with a sealant such as epoxy resin 212. The header is shown provided with a sealing rim 213 extending above its top surface 214, and a primary charge holder 215 is positioned about the sealing rim 213 and sealed to the top surface 214 of the header (such as by epoxy adhesive, ultrasonic welding, or the like). A bridge wire 216 or equivalent ignition element, such as the semiconductor bridge mentioned previously, is electrically connected between the heads of the pins 211 and 211'; and a primary charge 217 is placed in the primary charge holder. An O-ring 218 is placed on the shoulder 219 of the unitary header/base/shorting bar holder 210. The outer can 220, containing the secondary charge 221 overlies the unitary header/base/shorting bar holder 210 so that the O-ring 218 is compressed between shoulder 219 of the header and shoulder 222 of the outer can; while lower wall 223 of the outer can overlies and reinforces the outer cylindrical surface 224 of the unitary header/base/shorting bar holder 210, with the open end 225 of the outer can being crimped over lower edge 226 of the base portion of the unitary header/base/shorting bar holder 210. Optional interlocking features 227 define slots 228, shown in more detail in other Figures with respect to the unitary header/base/shorting bar holder alone) for interlocking with a connector (not shown) that will bring electrical power to the micro gas generator; and legs 229 and 229' of the shorting bar, extending alongside the shorting bar holder portion 230 (the remainder of the shorting bar itself is not visible in this view) contact the bodies of the contact pins 211 and 211' and short them together.

Figure 9:
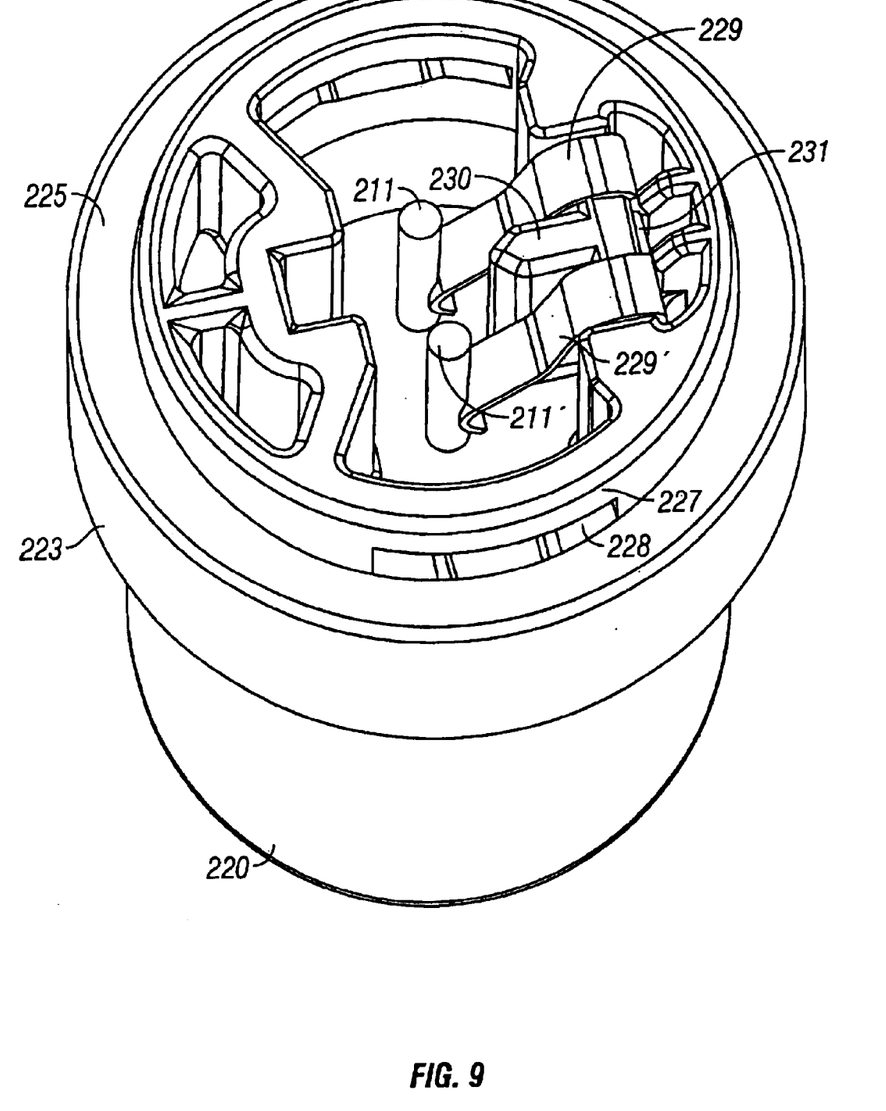
FIG. 9 is a perspective view of the micro gas generator of FIG. 8 from below and to the side of the base.

FIG. 9 is a perspective view of the micro gas generator of FIG. 8 from below and to the side of the base. Clearly visible in this Figure are the pins 211 and 211' protruding through the base; the legs 229 and 229' of the shorting bar, extending alongside the shorting bar holder portion 230; and the central portion 231 of the shorting bar connecting the legs 229 and 229' and retained by shorting bar holder portion 230. Interlocking feature 227 and slot 228 are also visible (as are corresponding unnumbered feature and slot on the other side of the base). The outer can 220 is shown with its lower wall 223 overlying and reinforcing the (now hidden) outer wall of the base portion of the unitary header/base/shorting bar holder, and with the open end 225 crimped over the (now hidden) lower edge of the base. When the micro gas generator is emplaced on and interlocked with a complementary connector, pins 211 and 211' engage with corresponding electrical connections on the connector and the legs 229 and 229' of the shorting bar are urged away from the pins 211 and 211', to allow the micro gas generator itself to complete an electrical circuit and be capable of actuation when required.

Suitable materials for the primary charge holder, when separate from the unitary header/base/shorting bar holder of the invention, are those used for that unitary header/base/shorting bar holder, or other polymers such as poly (ethyleneimine). Suitable elastomers for the O-ring are Viton® A (vinylidene fluoride/hexafluoropropylene copolymer), Viton® F (vinylidene fluoride/hexafluoropropylene/tetrafluoroethylene terpolymer), EPDM (ethylene/propylene/butadiene terpolymer), and the like—it being important that the elastomers have low water permeability. Suitable materials for the outer can are low-corrosion metals and alloys, such as passivated stainless steel, for example of about 0.4 mm thickness, and typically scored across the top with two or three diametral lines at equal angles to about half the depth of the material, to encourage even opening of the can top when the generator is used. A suitable bridge wire is 80:20 nickel/chromium alloy (Tophet® C) having a diameter of 23 $\mu$m, attached to the heads of the contact pins by resistance welding, and having a resistance of about 2 $\Omega$. Other suitable ignition elements, such as semiconductor ignition elements, and the method of their attachment to the heads of the contact pins, are described for example in U.S. Pat. Nos. 3,366,055; 4,976,200; 5,085,146; 5,912,427; and PCT International Publication No. WO 94/19661. Suitable explosive materials for primary and secondary charges are described, for example, in U.S. Pat. No. 5,648,634; and will be readily adapted by those skilled in the art to the particular use to which the micro gas generator is to be put.

A representative assembly of the micro gas generator of this invention takes place as follows:

The two contact pins are forced through their holes in the header with a force of about 50 Kg: the slightly undersize holes forming a seal between the pins and the header;

Optionally, an epoxy sealant is placed around the heads of the contact pins, and dried;

Optionally, the contact pin heads are lapped to remove any stray sealant and ensure good contact for the bridgewire;

The bridgewire is resistance welded to the heads of the contact pins;

The primary charge holder is positioned about the sealing rim at the top of the header, and ultrasonically welded thereto;

The shorting bar is positioned to short the contact pins;

A primer is applied to the bridgewire, followed by loading of the primary charge into the primary charge holder;

The O-ring is placed on the shoulder of the unitary header/base/shorting bar holder;

The outer cup, containing the secondary charge, is placed over the loaded unitary header/base/shorting bar holder, forced on to compress the O-ring, and the rim of the cup crimped over the base, thereby assembling the micro gas generator.

Testing may be performed at several stages during and after assembly of the micro gas generator.

A person skilled in the art, having regard to that skill and this disclosure, and the knowledge of the art as represented by the documents cited in this application and incorporated in this application by reference, will have no difficulty in designing and manufacturing the unitary header/base/shorting bar holders of the invention and micro gas generators containing them.

The foregoing detailed description is offered primarily for purposes of illustration. It will be readily apparent to those skilled in the art that the precise shapes and structures, materials, and other parameters of the invention described herein may be further modified or substituted in various ways without departing from the spirit and scope of the invention; and all such modifications and substitutions are within the scope of this invention.

We claim:

1. A device for use in a micro gas generator having a output can and an O-ring, the device comprising:

a unitary body shaped to include a header, a base, and a shorting bar holder said unitary body having at least one bore for receiving an electrode and wherein the base has a diameter greater than a diameter of the header;

a shoulder of the base of the unitary body, the shoulder facing upwardly toward the header, wherein the base is configured so that the output can be sealingly engaged with the base thereof by compression of the O-ring placed on the shoulder and crimped about a bottom edge of the base thereof.

2. The device of claim 1 wherein the unitary body is made of a polymer.

3. The device of claim 2 wherein the unitary body is made of a fiber-reinforced polymer.

4. The device of claim 3 wherein the unitary body is made of a glass fiber-reinforced polybutylene terephthalate.

5. The device of claim 1, further comprising a primary charge holder that is unitary with the unitary body.

6. The device of claim 1, further comprising a pair of contact pins sealed hermetically through the header.

7. The device of claim 6, further comprising a shorting bar mounted within the shorting bar holder to short out the contact pins when the unitary body is not interlocked with a connector.

8. The device of claim 1, further comprising at least one vent defined by the base to permit free escape of gas from a non-sealed volume of the output can into which the unitary body is assembled.

9. The device of claim 1, further comprising an interlocking feature in the base to interlock the unitary body with a connector.

10. The device of claim 9, further comprising a keying feature to orient the unitary body with the connector.

11. A micro gas generator comprising:
(a) a unitary body shaped to include a header, a base, and a shorting bar holder;
(b) a pair of parallel contact pins extending through the unitary body and sealed there within, so that each pin has a head protruding above the top of a header portion of the unitary body and a body protruding through a base portion thereof;
(c) a shorting bar, mounted on the base and shorting the bodies of the contact pins;
(d) an ignition element connecting the beads of the contact pins;
(e) a primary charge adjacent to the ignition element and adapted to be ignited thereby;
(f) a single O-ring, seated on an external shoulder of the base of the unitary body, the shoulder facing upwardly toward the header; and
(g) an output can, mounted over the unitary body from the direction of the header, sealingly engaged with the base thereof by compression of the O-ring, and crimped about a bottom edge of the base thereof.

12. The generator of claim 11 further comprising a secondary charge to be ignited by the primary charge.

13. The generator of claim 11, wherein the unitary body is made of a material selected from one of the following: a polymer, a fiber-reinforced polymer, or a glass fiber-reinforced polybutylene terephthalate.

14. The generator of claim 11, further comprising a primary charge holder that is unitary with the unitary body.

15. The generator of claim 11, further comprising a keying feature to orient the unitary body with a connector.

16. The generator of claim 11 wherein the base is shaped to define at least one vent between the base and the output can to permit free escape of gas from a non-sealed volume of between the output can and the unitary body.

17. A micro gas generator comprising:
(a) a unitary body shaped to include a header, a base, and a shorting bar holder;
(b) a single O-ring, seated on an external shoulder of the base of the unitary body, the shoulder facing upwardly toward the header; and
(c) an output can, mounted over the unitary body from the direction of the header, sealingly engaged with the base thereof by compression of the O-ring, and crimped about a bottom edge of the base thereof,
(d) wherein the base is shaped to define at least one vent between the base and the output can to permit free escape of gas from a non-sealed volume of the output can into which the unitary body is assembled.

18. The generator of claim 17 wherein the unitary body is made of a material selected from one of the following: a polymer, a fiber-reinforced polymer, or glass fiber-reinforced polybutylene terephthalate.

19. The generator of claim 17, further comprising a primary charge holder that is unitary with the unitary body.

20. The generator of claim 17, further comprising a pair of contact pins sealed hermetically through the header.

21. The generator of claim 17, further comprising a shorting bar mounted within the shorting bar holder to short out contact pins in the unitary body when the unitary body is not interlocked with a connector.

22. The generator of claim 17, further comprising a keying feature to orient the unitary body with the a connector.

23. The generator of claim 17, further comprising as pair of parallel contact pins extending through the unitary body and sealed there within, so that each pin has a head protruding above the top of a header portion of the unitary body and a body protruding trough a base portion thereof.

24. The generator of claim 17, further comprising an ignition element connecting the heads of the contact pins.

25. The generator of claim 24, further comprising a primary charge adjacent to the ignition element and adapted to be ignited thereby.

26. The generator of claim 25 further comprising a secondary charge to be ignited by the primary charge.

* * * * *